United States Patent [19]

Naumann

[11] 4,228,866
[45] Oct. 21, 1980

[54] HYDRAULIC POWER-STEERING SYSTEM

[75] Inventor: Fritz Naumann, Stammham, Fed. Rep. of Germany

[73] Assignee: Audi NSU Auto Union AG, Neckarsulm, Fed. Rep. of Germany

[21] Appl. No.: 904,992

[22] Filed: May 11, 1978

[30] Foreign Application Priority Data

May 12, 1977 [DE] Fed. Rep. of Germany ....... 2721414

[51] Int. Cl.$^2$ .............................................. B62D 5/06
[52] U.S. Cl. ................................ 180/132; 137/625.69
[58] Field of Search ............... 180/131, 154, 155, 156, 180/157, 158, 159, 160, 161, 162, 163; 91/421, 418, 443, 463; 60/443; 137/625.69

[56] References Cited

U.S. PATENT DOCUMENTS

| 3,106,938 | 10/1963 | Gordon | 91/463 X |
|---|---|---|---|
| 4,033,236 | 7/1977 | Johnson | 91/463 |

FOREIGN PATENT DOCUMENTS 1303280  1/1973  United Kingdom ..................... 180/154

*Primary Examiner*—John J. Love
*Assistant Examiner*—Randall A. Schrecengost
*Attorney, Agent, or Firm*—Karl F. Ross

[57] ABSTRACT

A hydraulic power-steering system has a reversing spool-type valve whose spool may be displaced by the steering wheel and which is connected between a hydraulic pump and a power cylinder in turn connected to the vehicle wheels. This power cylinder has a piston whose effective surface areas exposed in respective chambers are of different size. The spool valve has a pair of input branches connected to the high-pressure side of the pump and a pair of output branches connected to the low-pressure side of the pump, and may assume an intermediate position in which each of the input branches is connected to a respective one of the output branches for hydrodynamic flow through the valve. In addition this valve has a pair of control ports connected to the respective chambers of the power cylinder, and connectable via respective compartments of the valve to respective input and output branches. A restriction is provided in that output branch connectable to the chamber of the piston face of smaller area so that in an intermediate position of the valve pressure builds up in the respective compartment and maintains the piston in balance. Displacement of the spool to one side or the other blocks and unblocks the input and output branches to displace the piston of the power cylinder.

10 Claims, 1 Drawing Figure

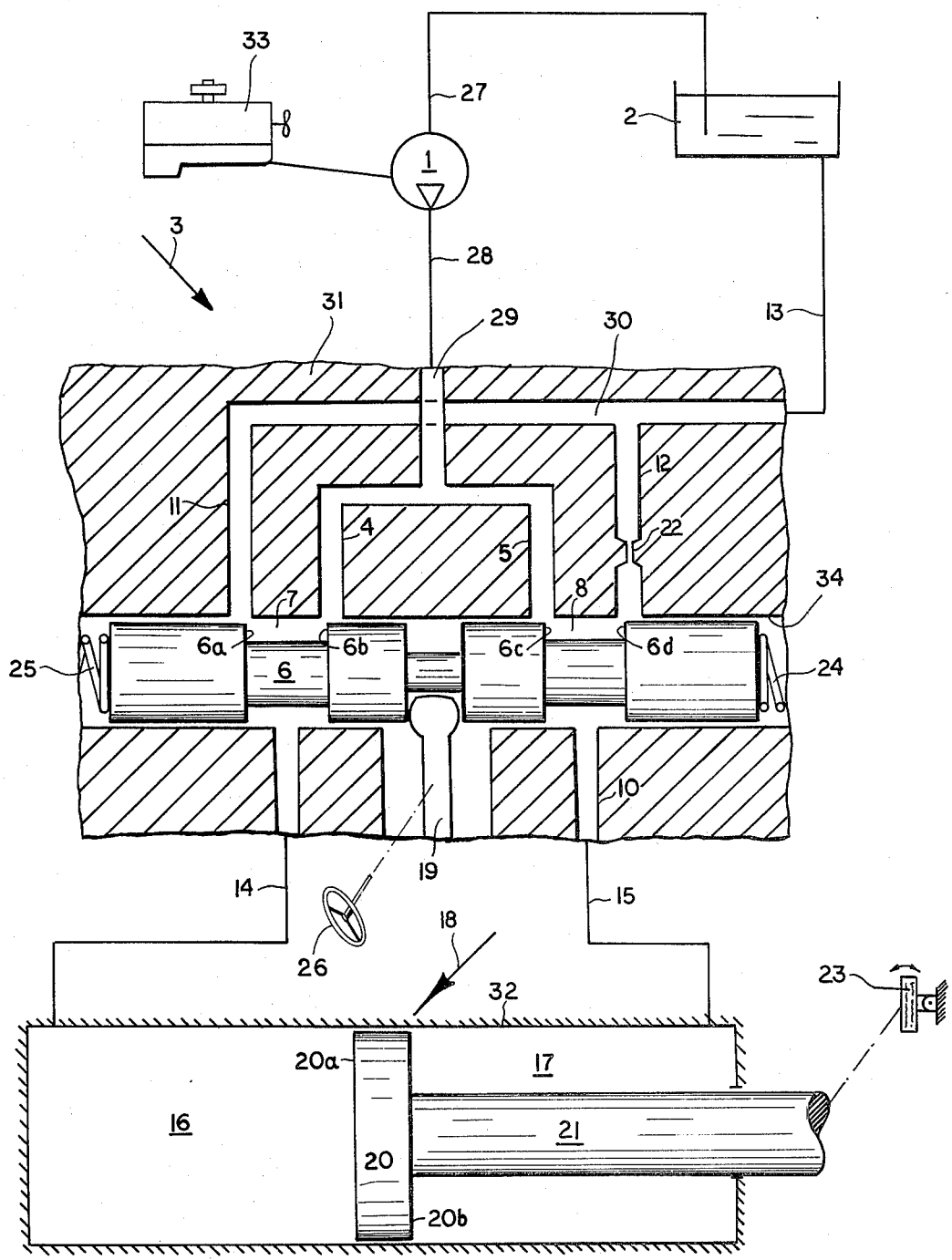

HYDRAULIC POWER-STEERING SYSTEM

FIELD OF THE INVENTION

The present invention relates to a hydraulic power-steering system.

BACKGROUND OF THE INVENTION

A hydraulic power-steering or power-assist steering system has a valve operated by the control member, the steering wheel, and connected between a source of hydraulic liquid under pressure and the control member, normally a power cylinder connected to the vehicle wheels. This power cylinder is a standard piston-and-cylinder unit having a piston rod extending through one wall of the cylinder, so that the effective surface area of the piston exposed in one compartment of the cylinder is smaller than that exposed in the other. In the intermediate position of the control valve both sides of the piston are equally pressurized. As a result of the difference in effective surface areas a net force is generated which urges the piston in one direction. This has the result of steering the vehicle to one side.

It has been suggested to overcome this disadvantage by providing a counteracting spring inside the power cylinder. Such an arrangement has, however, been found relatively ineffective due to the varying spring characteristic at different degrees of compression. Only in a central range does the spring force accurately counteract the differences in pressures on the piston, whereas at both ends, that is at maximum compression and at minimum compression, the spring force is different and the above-described imbalance in the system is present.

OBJECTS OF THE INVENTION

It is therefore an object of the present invention to provide an improved power-steering system.

Another object is to provide such a system which overcomes the above-given disadvantages.

Yet another object is to provide a steering system wherein the imbalance described above is overcome in such a manner that in any position of the piston of the power cylinder the effective forces on the faces of the piston are equal.

SUMMARY OF THE INVENTION

These objects are attained in a power-steering system according to the invention wherein a source of hydraulic liquid has a high-pressure side and a low-pressure side connected via respective inputs and outputs of a valve-control means having input branches connected to the input, output branches connected to the output, and a pair of control ports respectively connectd to the chambers or compartments of the power cylinder one of whose chambers is of larger effective surface area than the other. This control means is displaceable into one position wherein one of the input branches is connected to one of the control ports and one of the output branches is connected to the other control port and into another position wherein each input branch is connected to a respective output branch and to a respective control port for hydrodynamic flow through the control. According to this invention a restriction is provided in one of the branches connected to the other chamber in the other position, that is connected to the chamber of smaller effective surface area. Thus in this intermediate position wherein the high-pressure side and the low-pressure side of the hydraulic source are connected together through the control means the restriction will raise the pressure somewhat in that chamber or compartment of the control means connected to the chamber of the power cylinder of smaller effective surface area so as to raise the pressure therein. This restriction is dimensioned so the pressure in the chamber of smaller effective surface area is increased just enough that the net force across the piston will be equal to zero and no matter what position the piston is in there will be no tendency for it to move.

According to further features of this invention the control means is constituted by a reversing valve of the spool type and the restriction is integrally formed with the housing of the valve and provided in the output branch connected to the valve chamber that in turn is connected to the control port for the chamber of smaller surface area. The spool of this valve is operated by the steering wheel of the vehicle and is biased by relatively light compression springs into the central or intermediate position wherein there is hydrodynamic flow through the valve.

BRIEF DESCRIPTION OF THE DRAWING

The sole FIGURE of the drawing is a largely schematic diagram of the system according to this invention.

SPECIFIC DESCRIPTION

As shown in FIG. 1 a power-steering system basically comprises a source of fluid under pressure constituted by a pump 1 and reservoir 2 connected via a control valve 3 to a power cylinder 18. A vehicle steering wheel 26 is connected to the valve 3 and the power cylinder 18 is connected to steered wheels 23 of the vehicle.

More particularly the source of liquid under pressure is constituted by a hydraulic pump 1 connected permanently to the engine 33 of the vehicle, and having a low-pressure intake 27 and a high-pressure output 28. The intake 27 is connected to a dip tube in the reservoir 2 to which is also connected a return line 13.

The control valve 3 has a housing 31 formed with an intake passage 29 connected to the high-pressure side 28 and an output passage 30 connected to the return line 13. The intake passage 28 subdivides into branch passages 11 and 12 and the output passage 30 into branch passages 4 and 5. The housing 31 is also formed with a chamber 34 subdivided by a valve spool 6 into a first compartment 7 defined by surfaces 6a and 6b and communicating with branches 4 and 11 and a second compartment 8 defined by surfaces 6c and 6d and communicating with the branches 5 and 12. A control member 19 operated by the steering wheel 26 can displace this spool 6 in either direction against the force of biasing springs 24 and 25 that normally hold it in the illustrated central position. Finally the housing 31 is formed with control ports 9 and 10 opening centrally into the compartments 7 and 8 and situated so that no matter what position the spool 6 is in the ports 9 and 10 open into the respective compartments 7 and 8.

A power cylinder 18 has a cylinder or housing 32 subdivided by a piston 20 having faces 20a and 20b into compartments 16 and 17 that communicate via respective conduits 14 and 15 with the control ports 9 and 10. This piston 20 has a piston rod 21 connected to the steered wheel 23. The piston rod 21 reduces the effective surface area at the face 20b so that if both of the chambers 16 and 17 are equally pressurized the piston 20 will inherently move to the right, as the force at the face 20a will be greater.

According to the instant invention a restriction 22 is provided in the output branch 12 of the compartment 8 connected via the control port 10 in conduit 15 to the chamber 17. This restriction 22 is so dimensioned that when the valve is in the illustrated position pressure will back up somewhat in the compartment 8 so much that the force effective toward the left at the face 20b will be identical to the force effective toward the right at the face 20a. No matter what a position the piston is in relative to the cylinder 32 the forces will balance perfectly.

Otherwise the system operates in the well-known manner, that is if the steering wheel 26 is displaced to move the control member 19 toward the left as seen in the drawing the surfaces 6b and 6d will cut off the branches 4 and 12 so that the chamber 17 will be connected via the branch 5 to the high-pressure side 28 and the chamber 16 will be connected via the branch 11 to the return 13 constituted the low-pressure side of the source. This will obviously move the piston 20 toward the right as seen in the FIGURE. Opposite displacement of the spool will have the opposite effect.

It has been found according to this invention that while the restriction 22 plays an important part when the valve 3 is functioning hydrodynamically with fluid passing through it in the intermediate position, it has virtually no effect on the handling of the vehicle or the operation of the system when the valve spool 6 is displaced out of this central position. This is mainly due to the fact that once the valve is displaced out of the intermediate position the operation of the system is mainly hydrostatic rather than hydrodynamic, so that the restriction 22 will have little effect on operation.

I claim:

1. A hydraulic power-steering system comprising:
   a source of hydraulic liquid having a high-pressure side and a low-pressure side;
   a power cylinder having a pair of chambers one of which is of larger effective surface area then the other;
   control means having an input connected to said high-pressure side and having a pair of input branches, an output connected to said low-pressure side and having a pair of output branches, and a pair of control ports respectively connected to said chambers for displacement into one position wherein one of said input branches is connected to one of said control ports and one of said output branches is connected to the other control port and into a rest position wherein each input branch is connected to a respective output branch and to a respective control port; and
   a restriction in one of the branches connected to said other chamber in said rest position.

2. The system defined in claim 1 wherein said restriction is in the output branch connected to said other chamber in said rest position.

3. The system defined in claim 2 wherein said means includes a valve.

4. The system defined in claim 1 wherein said means is displaceable into yet another position wherein said other input branch is connected to said other control port and said one output branch is connected to said other control port.

5. The system defined in claim 4 wherein said means includes a reversing valve.

6. The system defined in claim 5 wherein said valve is a spool valve having a pair of chambers into each of which opens a respective input branch, a respective output branch, and a respective control port.

7. The system defined in claim 6 wherein said valve has a housing and said restriction is integrally formed in said housing.

8. A hydraulic power-steering system comprising:
   a source of hydraulic fluid having a high-pressure side and a low-pressure side;
   a reversing valve having:
   a valve housing formed with a valve chamber, with two input ports opening into said chamber and connected to said high-pressure side, with two output ports opening into said chamber and connected to said low-pressure side, and two control ports, and
   a valve body in said chamber displaceable between a pair of end positions in one of which one of said control ports is connected to said one of said input ports and the other control port is connected to one of said output ports and in the other of which said one control port is connected to the other of said output ports and said other control port is connected to the other of said input ports, and through an intermediate position in which said one input port is connected to said one output port and said other input port is connected to said other output port;
   means connectable to a steering wheel for selectively displacing said valve into said positions;
   a servomotor connectable through steering mechanism to vehicle wheels and having a cylinder and a piston subdividing the interior thereof into a pair of chambers one of which is of greater effective surface area of said piston than the other;
   respective conduits connecting said control ports to said chambers; and
   a restriction between said low-pressure side and said output port connectable through the respective control port to said other chamber of said servomotor and dimensioned so that in said intermediate position the forces exerted on said piston by said fluid in said chambers is substantially equal.

9. The system defined in claim 8, further comprising means biasing said body into said intermediate position.

10. The system defined in claim 8 wherein said valve is a spool valve and said valve chamber is subdivided by the valve spool into a pair of subchambers into each of which opens a respective input port, output port, and control port.

* * * * *